Dec. 2, 1941.  A. H. LENT  2,264,883
FISHING TACKLE
Filed July 29, 1940
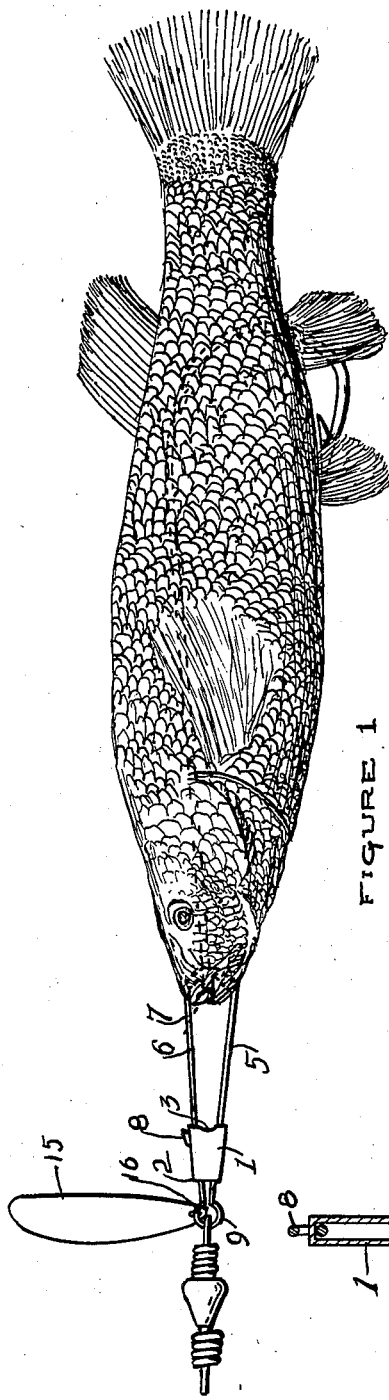
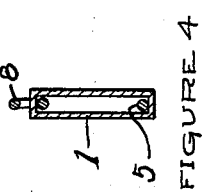
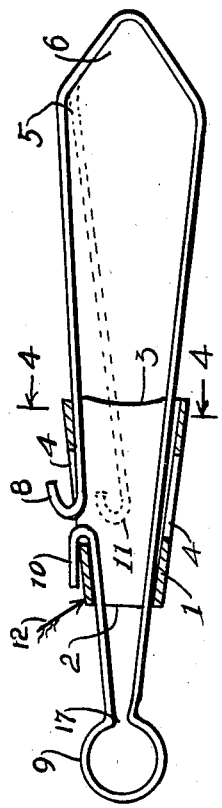
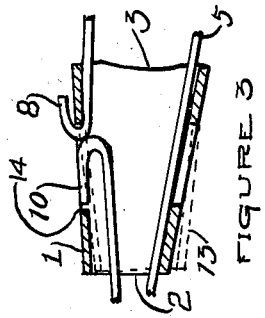
INVENTOR
Alfred Højer Lent
John A. Naismith
ATTORNEY Patented Dec. 2, 1941

2,264,883

UNITED STATES PATENT OFFICE 2,264,883

FISHING TACKLE

Alfred Hojer Lent, Capitola, Calif.

Application July 29, 1940, Serial No. 348,155

6 Claims. (Cl. 24—238)

The present invention relates particularly to the link upon which the fishhook is mounted, and which in turn is connected to the fish line through the medium of a swivel joint, and still more particularly to the type of link disclosed in my Patent No. 1,461,246, issued July 10, 1923.

In a link of the type referred to it is possible for the parts to be so manipulated during the struggles of a fish caught on the hook, that they accidentally become disengaged with consequent disastrous results.

It is therefore, one object of the present invention to provide a device of the character indicated so constructed and arranged that the parts are effectually locked in position when in a working position.

It is also an object of the invention to provide a device of the character indicated that will be economical to manufacture, simple in form and construction, quickly and easily adjusted to locked and unlocked positions, strong, durable, and highly efficient in its practical application.

In the drawing:

Figure 1 shows a device embodying my invention in operative position relative to a baited hook.

Figure 2 is an enlarged sectional view through the device showing the parts in unlocked position.

Figure 3 is an enlarged sectional view through the device showing the parts in locked position, parts being broken away.

Figure 4 is a sectional view on line 4—4 of Figure 2.

In the particular embodiment of the invention herein disclosed I show at 1 a wedge-shaped sleeve that is open at its two ends 2 and 3, and has slots as 4 formed in its top and bottom narrow converging edges.

The swivel and hook connecting element comprises a wire 5 bent at one point to form a large loop 6 for engagement with the fishhook 7, and terminating in an outwardly directed hook 8. The said wire 5 is bent at another point to form a small loop as 9 directly opposed to loop 6, and terminates in a hook 10, said hook 10 being directed outwardly as shown and disposed in the plane of hook 8.

When the parts are in the position shown in Figure 2 the sleeve 1 is advanced to the limit of its movement in the direction of the large loop 6 and consequently in engagement with the hook 10. In this position of the sleeve the hook 8 may be depressed through the slot 4 to the position indicated in dotted lines at 11, permitting the sliding of the sleeve clear back to loop 9 and leaving the hook 8 free for the removal or mounting of another fishhook.

When the fishhook has been properly adjusted the sleeve 1 is again moved toward the large loop 6, a slight pressure on the sleeve in the direction indicated by arrow 12 causing the sleeve to engage the hook 10. While this operation is taking place the hook 8 has been depressed to enter the sleeve and, due to the resiliency of the wire, it naturally springs out through the slot 4 to the position shown in Figure 2.

By reversing the sliding movement of the sleeve 1 the sleeve is caused to engage the hook 8 as shown in Figure 3. This latter movement of the sleeve, however, moves it out of engagement with the hook 10. In Figure 3 the sleeve 1 is shown in dotted lines at 13 in the same position as in Figure 2, but due to the corresponding wedge formation of the wire 5 and the outward pressure of hook portion 8 on the end 3 of the sleeve, it is automatically thrown into the position shown in solid lines. In this latter position the sleeve cannot be moved longitudinally to disengage the hook 8 because the edge of the slot 4 abuts the end of hook 10 as at 14 and the hook 8 abuts the hook 10.

The spoon 15 is mounted on the loop 9 as at 16, and the wire 5 is brought close together at 17 so that the spoon cannot in any manner engage the sleeve and effect its disengagement with the hook 8.

A very important feature of the invention is that due to the form and characteristics of the parts the sleeve 1 will automatically slide from the position shown in Figure 2 to the position shown in Figure 3 where the hook is in locking position relative to the sleeve. That is to say, that if the sleeve 1 is not manually slid into position the shape of the parts and their relative positions is such that the sleeve 1 will automatically assume the locked position.

Although a certain specific embodiment of the invention has been herein illustrated and described, it will be understood that various alterations in the details of construction and mode of application and assembly may be made without departing from the scope of the invention as indicated in the accompanying claims.

I claim:

1. A device of the character described comprising, a section of wire having bends therein forming opposing loops and having bends in its ends forming oppositely directed abutting hooks, and a sleeve encompassing and slidably mounted on the wire and having an opening formed therein engageable with either hook.

2. A device of the character described comprising a section of wire having bends therein forming opposing loops and having bends in its ends forming oppositely directed abutting hooks, and a sleeve slidably mounted on the wire to engage either hook.

3. A device of the character described comprising, a sleeve having an opening therein, a link having abutting hook-shaped ends receivable in said opening, one of said hooks having a terminal portion of such a length as to engage the edge of the opening to prevent the accidental disengagement of the other hook from said sleeve.

4. A device of the character described comprising a link having angularly disposed sides to form end loops of unequal size and having its ends disposed on one side and provided with bends forming oppositely directed abutting hooks, and a wedge-shaped sleeve slidably mounted thereon to engage either hook and provided with an opening adapted to receive both hooks.

5. A device of the character described comprising, a wedge-shaped sleeve having an opening formed in an edge thereof, and a correspondingly wedge-shaped wire link, the ends of the link being provided with bends forming oppositely directed abutting hooks disposed intermediate the length of the link to pass through the opening in the sleeve when the link is in the sleeve with its other side disposed against the opposite side of the sleeve.

6. A device of the character described comprising a section of wire having bends therein forming a wedge-shaped link, the ends of the wire having bends therein forming oppositely directed abutting hooks on one side of the link, and a wedge-shaped sleeve slidably encompassing the link and provided with a slot disposed to receive both of said hooks.

ALFRED HOJER LENT.